(12) United States Patent
Feng

(10) Patent No.: US 11,188,178 B2
(45) Date of Patent: Nov. 30, 2021

(54) TOUCH DISPLAY PANEL, MANUFACTURING METHOD THEREOF, AND TOUCH DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Xiaoliang Feng, Hubei (CN)

(73) Assignee: WUHAN CHINA STAR OPTOFI FCTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/349,270

(22) PCT Filed: Mar. 11, 2019

(86) PCT No.: PCT/CN2019/077707
§ 371 (c)(1),
(2) Date: May 12, 2019

(87) PCT Pub. No.: WO2020/124804
PCT Pub. Date: Jun. 25, 2020

(65) Prior Publication Data
US 2020/0201483 A1    Jun. 25, 2020

(30) Foreign Application Priority Data

Dec. 17, 2018 (CN) .......................... 201811545395.8

(51) Int. Cl.
*G06F 3/044*    (2006.01)

(52) U.S. Cl.
CPC .. *G06F 3/0445* (2019.05); *G06F 2203/04103* (2013.01); *G06F 2203/04107* (2013.01)

(58) Field of Classification Search
CPC ......... G06F 3/0445; G06F 2203/04107; G06F 2203/04103; G06F 3/0446; G06F 3/0443
See application file for complete search history.

(56) References Cited

U.S. PATENT DOCUMENTS

| | | | |
|---|---|---|---|
| 2014/0227810 A1 | 8/2014 | Kim et al. | |
| 2017/0139519 A1 | 5/2017 | Xu | |
| 2018/0032197 A1* | 2/2018 | Jin | ........................ G06F 3/0446 |
| 2018/0033834 A1* | 2/2018 | Jun | ........................ G06F 3/0443 |
| 2018/0158876 A1 | 6/2018 | Shi | |

(Continued)

FOREIGN PATENT DOCUMENTS

| | | |
|---|---|---|
| CN | 101154677 A | 4/2008 |
| CN | 103035848 A | 4/2013 |

(Continued)

*Primary Examiner* — Sahlu Okebato
(74) *Attorney, Agent, or Firm* — Mark M. Rriedman

(57) ABSTRACT

A touch display panel, a manufacturing method thereof, and a touch display device are provided. The touch display panel includes a substrate, a touch layer, a protective layer, an array substrate, and an organic light-emitting element. The touch layer includes a touch pattern layer, a first insulating layer, and a bridge layer. The organic light-emitting element includes an anode, a cathode, and a light-emitting layer disposed between the anode and the cathode.

20 Claims, 3 Drawing Sheets

(56) References Cited

U.S. PATENT DOCUMENTS

| | | |
|---|---|---|
| 2018/0253175 A1 | 9/2018 | Yao |
| 2019/0187843 A1 | 6/2019 | Ye |
| 2019/0204975 A1 | 7/2019 | Xie et al. |
| 2019/0393440 A1* | 12/2019 | Xin .................... H01L 27/3258 |

FOREIGN PATENT DOCUMENTS

| | | |
|---|---|---|
| CN | 103647028 A | 3/2014 |
| CN | 104777935 A | 7/2015 |
| CN | 105742330 A | 7/2016 |
| CN | 105808005 A | 7/2016 |
| CN | 106816460 A | 6/2017 |
| CN | 107066160 A | 8/2017 |
| CN | 107977116 A | 5/2018 |

\* cited by examiner

TOUCH DISPLAY PANEL, MANUFACTURING METHOD THEREOF, AND TOUCH DISPLAY DEVICE

FIELD OF INVENTION

The present invention relates to the field of display, and in particular to a touch display panel, a manufacturing method thereof, and a touch display device.

BACKGROUND OF INVENTION

With the development of the information age and the accelerated pace of life, touch technology has gradually replaced traditional mouse and keyboard due to its user-friendly design and simple and fast input. It is widely used in various electronic products. Capacitive touch screens are widely used because of their fast response, high sensitivity, and high reliability.

According to different ways in which the touch sensing layer is disposed in the display panel, the touch display panel is divided into structures of an add-on mode, an in-cell, and an on-cell. Considering factors such as process and yield, only mass production of display devices using on-cell technology can be realized at present.

Since the organic light-emitting element in the touch display panel is sensitive to temperature and moisture, a touch layer being prepared on the upper glass substrate of the touch display panel is easily restricted by environment and temperature, so the process puts forward higher requirements about material and preparation of the touch layer.

Therefore, there is a need for a display device, a manufacturing method thereof, and a touch display device to solve the above problems.

SUMMARY OF INVENTION

The present invention provides a touch display panel, a manufacturing method thereof, and a touch display device to solve the technical problem that the organic light-emitting element in the existing touch display panel interferes with the preparation of the touch layer.

To solve the above problems, the technical solution provided by the present invention is as follows:

According to an aspect of the present invention, a touch display panel is provided, comprising:

a substrate;

a touch layer disposed on the substrate, the touch layer including a touch pattern layer, a first insulating layer, and a bridge layer;

a protective layer disposed on the touch layer, the protective layer covering the bridge layer;

an array substrate disposed on the protective layer, the array substrate including an array of thin film transistors; and an organic light-emitting element disposed over the protective layer, the organic light-emitting element including an anode, a cathode, and a light-emitting layer disposed between the anode and the cathode.

In the touch display panel of the present invention, the touch display panel includes a plurality of light-emitting areas and a plurality of non-light-emitting areas each between adjacent light-emitting areas;

wherein the organic light-emitting element is disposed in a corresponding light-emitting area, and the thin film transistor is disposed in a corresponding non-light-emitting area.

In the touch display panel of the present invention, the thin film transistor includes:

an active layer disposed on the protective layer, the active layer including an intermediate channel region and a source doped region and a drain doped region at both ends of the channel region;

a second insulating layer disposed on the active layer;

a first metal layer disposed on the second insulating layer, the first metal layer being disposed opposite to the channel region;

a third insulating layer, disposed on the first metal layer and the anode, and covering the first metal layer and the anode; and a second metal layer disposed on the third insulating layer, the second metal layer including a source metal and a drain metal, the source metal being electrically connected to the source doped region, and the drain metal being electrically connected to the drain doping region.

In the touch display panel of the present invention, the touch display panel further includes:

the anode, disposed on the second insulating layer and separated from the first metal layer;

a first electrode layer disposed on the anode, the first electrode layer being disposed opposite to the anode, a first via hole for accommodating the light-emitting layer being defined in the first electrode layer, and the first electrode layer being electrically connected to the drain metal;

a pixel-defining layer disposed on the second metal layer, the pixel-defining layer covering the second metal layer and the third insulating layer, and the pixel-defining layer including pixel-defining bodies that are spaced apart from each other;

the light-emitting layer, disposed between adjacent pixel-defining bodies and electrically connected to the anode through the first via hole; and the cathode, disposed on the pixel-defining layer and the light-emitting layer.

In the touch display panel of the present invention, the anode is a transparent anode.

In the touch display panel of the present invention, the touch pattern layer includes a grid-shaped driving electrode and a grid-shaped sensing electrode, the driving electrode and the sensing electrode are both grid structures, and one of the driving electrode and the sensing electrode is bridged by the bridge layer.

In the touch display panel of the present invention, an orthographic projection pattern of the light-emitting layer on the touch pattern layer is located in the grid of the touch pattern layer.

In the touch display panel of the present invention, the driving electrode and the sensing electrode are both diamond-shaped grid structures.

In the touch display panel of the present invention, the touch display panel further includes a first encapsulation layer and a second encapsulation layer;

the first encapsulation layer disposed between the protective layer and the array substrate; and the second encapsulation layer disposed on the cathode.

According to another aspect of the present invention, a manufacturing method of a touch display panel is also provided. The manufacturing method of a touch display panel comprises steps as follows:

S10: providing a base, forming a substrate on the base, and forming a touch layer on the substrate, the touch layer including a touch pattern layer, a first insulating layer, and a bridge layer;

S20: forming a protective layer on the touch layer;

S30: forming an array substrate and an organic light-emitting element on the protective layer, the array substrate including an array of thin film transistors, and the organic light-emitting element including an anode, a cathode, and a light-emitting layer disposed between the anode and the cathode; and S40: peeling off the base.

In the manufacturing method of a touch display panel of the present invention, the touch pattern layer includes a grid-shaped driving electrode and a grid-shaped sensing electrode, the driving electrode and the sensing electrode are both grid structures, and an orthographic projection pattern of the light-emitting layer on the touch pattern layer is located in the grid of the touch pattern layer.

According to still another aspect of the present invention, a touch display device is also provided comprising a touch display panel and a polarizer, the touch display panel comprising:

a substrate;

a touch layer disposed on the substrate, the touch layer including a touch pattern layer, a first insulating layer, and a bridge layer;

a protective layer disposed on the touch layer, the protective layer covering the bridge layer;

an array substrate disposed on the protective layer, the array substrate including an array of thin film transistors; and an organic light-emitting element disposed over the protective layer, the organic light-emitting element including an anode, a cathode, and a light-emitting layer disposed between the anode and the cathode.

In the touch display device of the present invention, the touch display panel includes a plurality of light-emitting areas and a plurality of non-light-emitting areas each between adjacent light-emitting areas;

wherein the organic light-emitting element is disposed in a corresponding light-emitting area, and the thin film transistor is disposed in a corresponding non-light-emitting area.

In the touch display device of the present invention, the thin film transistor includes:

an active layer disposed on the protective layer, the active layer including an intermediate channel region and a source doped region and a drain doped region at both ends of the channel region;

a second insulating layer disposed on the active layer;

a first metal layer disposed on the second insulating layer, the first metal layer being disposed opposite to the channel region;

a third insulating layer, disposed on the first metal layer and the anode, and covering the first metal layer and the anode; and a second metal layer disposed on the third insulating layer, the second metal layer including a source metal and a drain metal, the source metal being electrically connected to the source doped region, and the drain metal being electrically connected to the drain doping region.

In the touch display device of the present invention, the following is included:

the anode, disposed on the second insulating layer and separated from the first metal layer;

a first electrode layer disposed on the anode, the first electrode layer being disposed opposite to the anode, a first via hole for accommodating the light-emitting layer being defined in the first electrode layer, and the first electrode layer being electrically connected to the drain metal;

a pixel-defining layer disposed on the second metal layer, the pixel-defining layer covering the second metal layer and the third insulating layer, and the pixel-defining layer including pixel-defining bodies that are spaced apart from each other;

the light-emitting layer, disposed between adjacent pixel-defining bodies and electrically connected to the anode through the first via hole; and the cathode, disposed on the pixel-defining layer and the light-emitting layer.

In the touch display device of the present invention, the anode is a transparent anode.

In the touch display device of the present invention, the touch pattern layer includes a driving electrode and a sensing electrode, the driving electrode and the sensing electrode are both grid structures, and one of the driving electrode and the sensing electrode is bridged by the bridge layer.

In the touch display device of the present invention, an orthographic projection pattern of the light-emitting layer on the touch pattern layer is located in the grid of the touch pattern layer.

In the touch display device of the present invention, the driving electrode and the sensing electrode are both diamond-shaped grid structures.

In the touch display device of the present invention, the touch display panel further includes a first encapsulation layer and a second encapsulation layer;

the first encapsulation layer disposed between the protective layer and the array substrate; and the second encapsulation layer disposed on the cathode.

Advantageous Effects: The touch layer is disposed between the substrate and the organic light-emitting element, and the organic light-emitting element is prepared by preparing the touch layer first, so that the process of the touch layer is not affected by the organic light-emitting element, thereby improving product yield.

DESCRIPTION OF DRAWINGS

In order to more clearly illustrate the technical solutions in the embodiments of the present invention, the drawings used in the description of the embodiments will be briefly described below. It is obvious that the drawings in the following description are only some embodiments of the present invention. Other drawings can also be obtained from those skilled in the art based on these drawings without paying any creative effort.

DETAILED DESCRIPTION OF PREFERRED EMBODIMENTS

Figure 1:
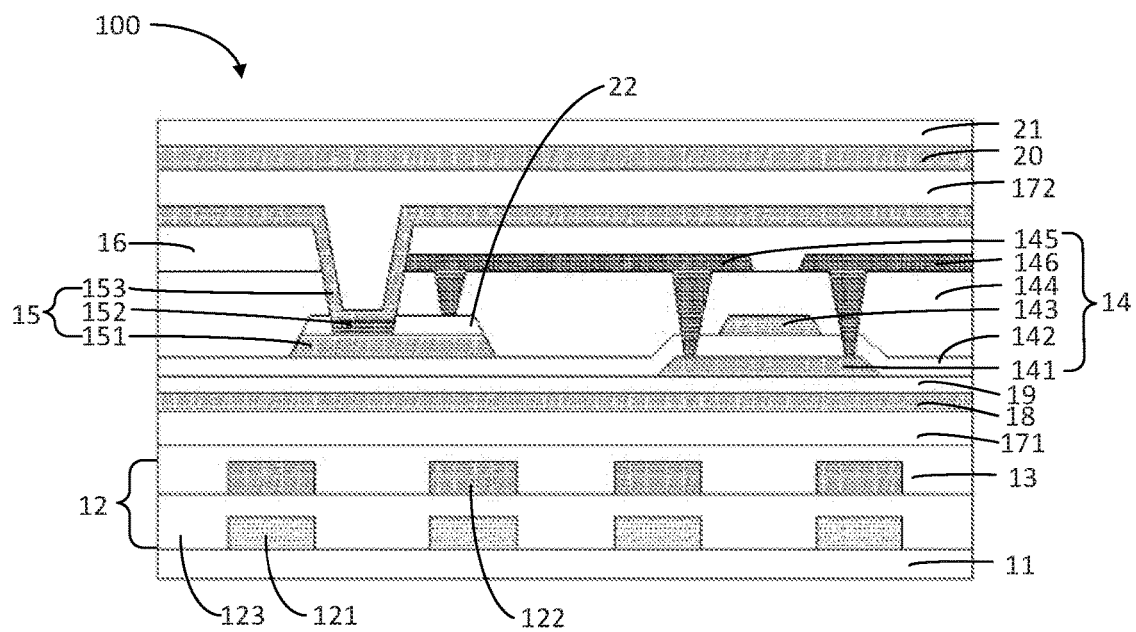
FIG. 1 is a cross-sectional view of a touch display panel according to a first embodiment of the present invention.

The following description of the embodiments is with reference to the drawings and is provided to illustrate the specific embodiments of the invention. The directional terms mentioned in the present invention, such as 'upper', 'lower', 'front', 'back', 'left', 'right', 'top', 'bottom', etc., are only the directions in the drawings. Therefore, the directional terminology used is for the purpose of illustration and understanding of the invention rather than limiting the invention. In the figures, structurally similar elements are denoted by the same reference numerals.

The present invention provides a touch display panel, a manufacturing method thereof, and a touch display device to solve the technical problem that the organic light-emitting element in the existing touch display panel interferes with the preparation of the touch layer.

Referring to FIG. 1, FIG. 1 is a cross-sectional view of a touch display panel 100 according to a first embodiment of the present invention.

According to an aspect of the present invention, a touch display panel 100 comprising a substrate 11, a touch layer 12, a protective layer 13, an array substrate, and an organic light-emitting element 15 is provided.

The material for preparing the substrate 11 includes one of a polyimide and an organic resin.

Figure 2:
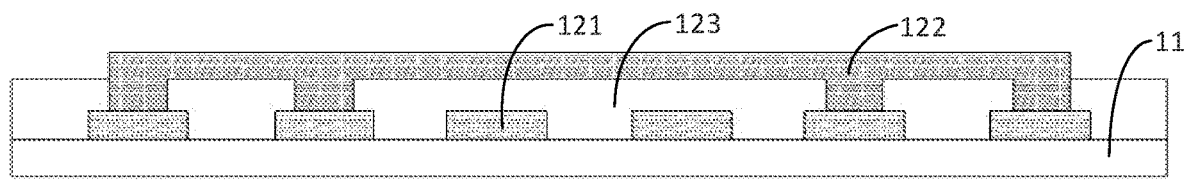
FIG. 2 is a cross-sectional view of a touch layer and a substrate according to a second embodiment of the present invention.

Referring to FIG. 2, FIG. 2 is a cross-sectional view of a touch layer 12 and a substrate 11 according to a second embodiment of the present invention.

Figure 3:
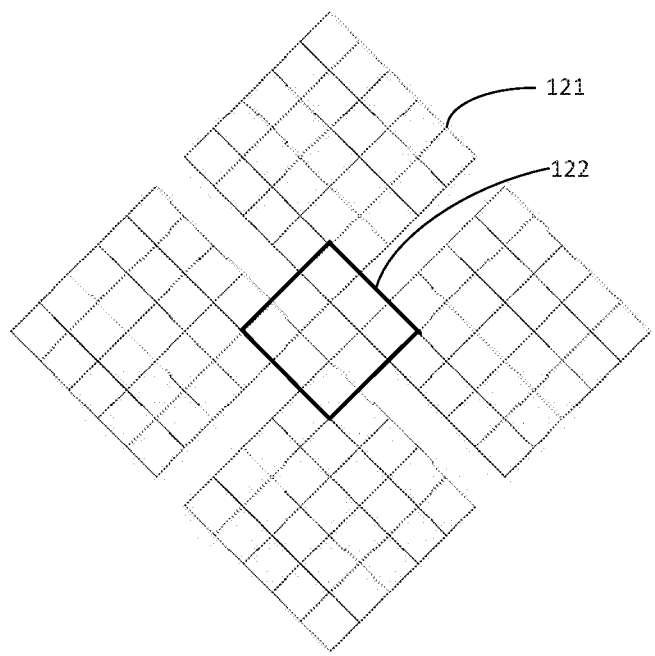
FIG. 3 is a top view of an electrode of a touch layer according to a third embodiment of the present invention.

Referring to FIG. 3, FIG. 3 is a top view of an electrode of a touch layer 12 according to a third embodiment of the present invention.

The touch layer 12 is disposed on the substrate 11, and the touch layer 12 includes a touch layer 121, a first insulating layer 123, and a bridge layer 122.

In one embodiment, the touch layer 121 comprises a sensing electrode and a driving electrode, and the sensing electrode and the driving electrode are both grid structures; wherein one of the driving electrode and the sensing electrode is bridged by the bridge layer 122.

The driving electrode and the sensing electrode are both prepared using a conductive metal.

The material for preparing the first insulating layer 123 may be the organic resin, or may be tantalum nitride or hafnium oxide.

The bridge layer 122 includes a jumper metal.

A via hole for electrically connecting the driving electrode or the sensing electrode to the bridge layer 122 is disposed in the first insulating layer 123.

This is because when the sensing electrode and the driving electrode are disposed on the same metal layer, the sensing electrode and the driving electrode are insulated from each other. But when the two need to 'cross', they need to be realized by the bridge layer 122.

In one embodiment, the driving electrode and the sensing electrode are both diamond-shaped grid structures.

The protective layer 13 is disposed on the touch layer 121 and the bridge layer 122. The preparation material of the protective layer 13 includes the organic resin. Meanwhile, the protective layer 13 can function to planarize the bridge layer 122.

In an embodiment, the upper/lower relationship between the touch layer 121 and the bridge layer 122 is not specifically limited, and may be specifically determined according to actual conditions.

In the preparation of the touch layer 12 of the above structure, the required processes are not limited by low temperature, so that high-temperature preparation can be employed, which can improve reliability of the process.

The array substrate is disposed on the protective layer 13, and the array substrate includes an array of thin film transistors 14.

The organic light-emitting element 15 is disposed over the protective layer 13, and the organic light-emitting element 15 includes an anode 151, a cathode 153, and a light-emitting layer 152 disposed between the anode 151 and the cathode 153.

In one embodiment, the organic light-emitting element 15 further includes a hole injection layer, a hole transport layer, an electron transport layer, and an electron injection layer.

The hole injection layer and the hole transport layer are disposed between the anode 151 and the light-emitting layer 152, and the electron transport layer and the electron injection layer are disposed between the anode 151 and the light-emitting layer 152.

In one embodiment, the touch display panel 100 includes a plurality of light-emitting areas and a plurality of non-light-emitting areas each between adjacent light-emitting areas;

wherein the organic light-emitting element 15 is disposed in a correponding light-emitting area, and the thin film transistor 14 is disposed in a corresponding non-light-emitting area.

In one embodiment, the thin film transistor 14 includes:

an active layer 141 disposed on the protective layer 13, the active layer 141 including an intermediate channel region and a source doped region and a drain doped region at both ends of the channel region;

a second insulating layer 142 disposed on the active layer 141;

a first metal layer 143 disposed on the second insulating layer 142, the first metal layer 143 being disposed opposite to the channel region;

a third insulating layer 144, disposed on the first metal layer 143 and the anode 151, and covering the first metal layer 143 and the anode 151; and a second metal layer disposed on the third insulating layer 144, the second metal layer including a source metal 146 and a drain metal 145, the source metal 146 being electrically connected to the source doped region, and the drain metal 145 being electrically connected to the drain doping region.

The touch display panel 100 further includes a second via hole and a third via hole. The second via hole and the third via hole are both disposed in the second insulating layer 142 and the third insulating layer 144. The drain metal 145 is electrically connected to the drain doping region through the second via hole, and the source metal 146 is electrically connected to the source doping region through the third via hole.

In one embodiment, the first metal layer 143 includes a gate metal.

In one embodiment, the touch display panel 100 further includes a barrier layer 18 and a first buffer layer 19 disposed between the active layer 141 and the protective layer 13;

wherein the barrier layer is disposed on the protective layer 13, and the material for preparing the barrier layer 18 comprises tantalum nitride.

The first buffer layer 19 is disposed on the barrier layer 18, and the preparation material of the first buffer layer 19 includes one of tantalum nitride, hafnium oxide, and hafnium oxynitride.

In an embodiment, the touch display panel 100 further includes:

the anode 151, disposed on the second insulating layer 142 and separated from the first metal layer 143;

a first electrode layer 22 disposed on the anode 151, the first electrode layer 22 being disposed opposite to the anode 151, a first via hole for accommodating the light-emitting layer 152 being defined in the first electrode layer 22, and the first electrode layer 22 being electrically connected to the drain metal 145;

a pixel-defining layer 16 disposed on the second metal layer, the pixel-defining layer 16 covering the second metal layer and the third insulating layer 144, and the pixel-defining layer 16 including pixel-defining bodies that are spaced apart from each other;

the light-emitting layer 152, disposed between adjacent pixel-defining bodies and electrically connected to the anode 151 through the first via hole; and the cathode 153, disposed on the pixel-defining layer 16 and the light-emitting layer 152.

The touch display panel 100 further includes a fourth via hole. The fourth via hole is disposed in the third first buffer layer 19. The first electrode layer 22 is electrically connected to the source metal 146 through the fourth via hole.

In one embodiment, the thin film transistor 14 is disposed within coverage of the pixel-defining layer 16.

In one embodiment, the anode 151 is a transparent anode, the preparation material of the anode 151 includes indium zinc oxide, and the indium zinc oxide is a transparent metal material.

In one embodiment, the light emitted by the light-emitting layer 152 is emitted through the anode 151. The anode 151 prepared by using indium zinc oxide has a higher transmittance than the cathode 153, which is beneficial to improving brightness of the touch display panel 100.

Furthermore, in the present invention, since the metal layer and the light-emitting layer 152 of the thin film transistor 14 are disposed substantially in different regions of the same horizontal plane, it is possible to prevent the structure of the thin film transistor 14 from affecting the light output of the light-emitting layer 152, which is advantageous to increase the brightness of the touch display panel 100.

Figure 4:
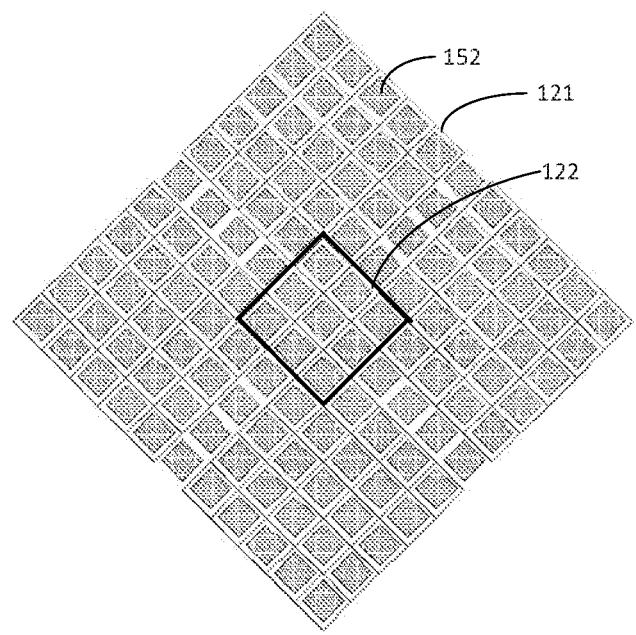
FIG. 4 is a schematic chart of an electrode pattern of a touch layer and positions of a light-emitting layer according to a third embodiment of the present invention.

Referring to FIG. 4, FIG. 4 is a schematic chart of an electrode pattern of a touch layer 12 and positions of a light-emitting layer 152 according to a third embodiment of the present invention.

In an embodiment, in order to prevent the touch layer 12 from affecting the light output of the light-emitting layer 152, an orthographic projection pattern of the light-emitting layer 152 on the touch layer 121 is located in the grid of the touch layer 121. That is, the light emitted from the light-emitting layer 152 is emitted from the grid gap of the touch layer 121, so that the structure of the touch layer 12 does not block the light output.

In one embodiment, the touch display panel 100 further includes a first encapsulation layer 171 and a second encapsulation layer 172;

the first encapsulation layer 171 disposed between the protective layer 13 and the array substrate; and the second encapsulation layer 172 disposed on the cathode 153.

The double-package layer structure design of the touch display panel 100 is more advantageous for improving the barrier of water and oxygen of the organic light-emitting element 15 and prolonging service life of the organic light-emitting element 15.

In one embodiment, the touch display panel further includes a second buffer layer 20 disposed on the second encapsulation layer, and a flexible layer 21 disposed on the second buffer layer 20.

The flexible layer 21 corresponds to a substrate at the other end of the touch display panel.

In one embodiment, the touch display panel 100 further includes a polarizer and a cover;

the polarizer and the cover both disposed on a side of the substrate 11 facing away from the touch layer 12, and the polarizer disposed between the cover and the substrate 11.

Figure 5:
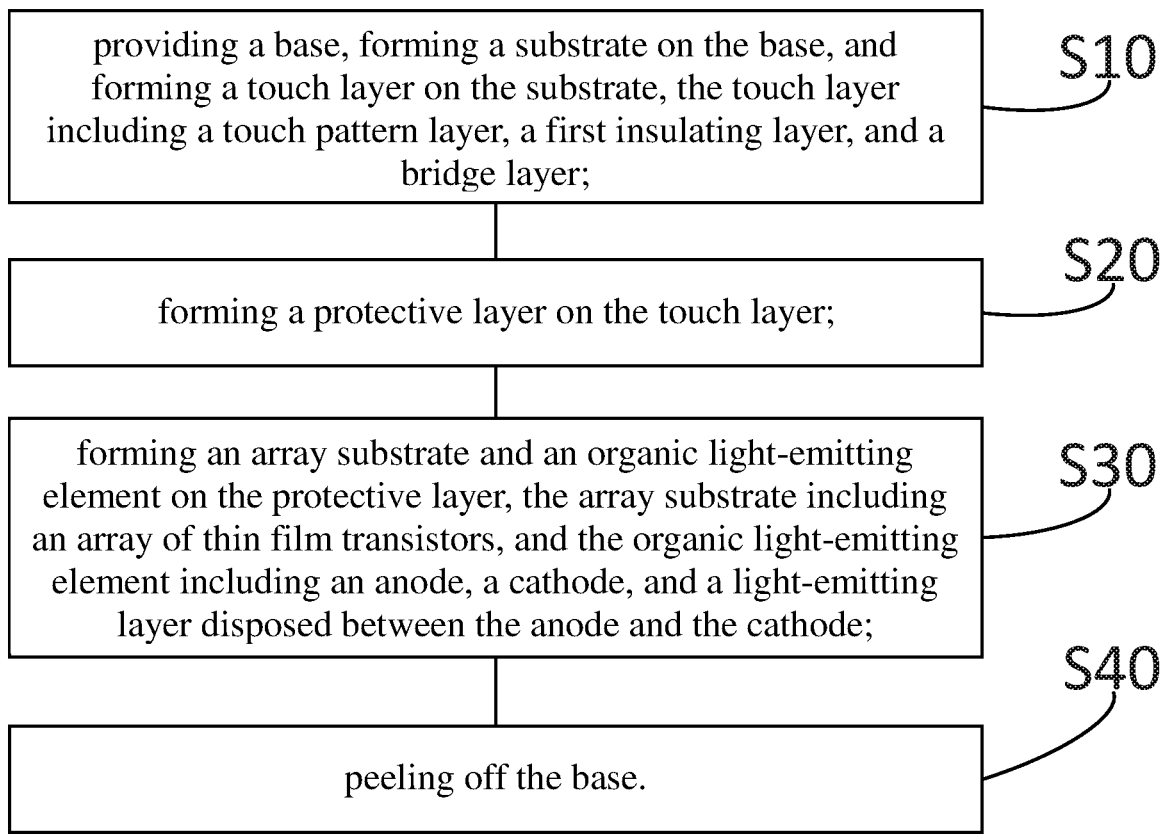
FIG. 5 is a schematic flow chart of a manufacturing method of a touch display panel according to a fourth embodiment of the present invention.

Referring to FIG. 5, FIG. 5 is a schematic flow chart of a manufacturing method of a touch display panel 100 according to a fourth embodiment of the present invention.

According to another aspect of the present invention, the manufacturing method of the touch display panel 100 is further provided. The manufacturing method of the touch display panel 100 includes the following steps:

S10: providing a base, forming a substrate 11 on the base, and forming a touch layer 12 on the substrate 11, the touch layer 12 including a touch layer 121, a first insulating layer 123, and a bridge layer 122;

S20: forming a protective layer 13 on the touch layer 12;

S30: forming an array substrate and an organic light-emitting element 15 on the protective layer 13, the array substrate comprising an array of thin film transistors 14, and the organic light-emitting element 15 comprising an anode 151, a cathode 153, and a light-emitting layer 152 disposed between the anode 151 and the cathode 153; and S40: peeling off the base.

The above embodiment adopts a transfer-like scheme, preferentially prepares the touch layer 12, and then prepares the organic light-emitting element 15. Therefore, the preparation process of the touch layer 12 is not limited by the organic light-emitting element 15, which is beneficial to improving the yield and trustworthiness of the product.

In one embodiment, the touch layer 121 includes a grid-shaped driving electrode and a sensing electrode;

wherein an orthographic projection pattern of the light-emitting layer 152 on the touch layer 121 is located in the grid of the touch layer 121.

Advantageous Effects: The touch layer is disposed between the substrate and the organic light-emitting element, and the organic light-emitting element is prepared by preparing the touch layer first, so that the process of the touch layer is not affected by the organic light-emitting element, thereby improving product yield.

In the above, although the present invention has been disclosed in the above preferred embodiments, the above-described preferred embodiments are not intended to limit the invention, and those skilled in the art can make various kinds without departing from the spirit and scope of the present invention. The scope of protection of the present invention is determined by the scope defined by the claims.

What is claimed is:

1. A touch display panel, comprising:
   a substrate;
   a touch layer disposed on the substrate, the touch layer including a touch pattern layer, a first insulating layer, and a bridge layer;
   a protective layer disposed on the touch layer, the protective layer covering the bridge layer;
   an array substrate disposed on the protective layer, the array substrate including an array of thin film transistors; and
   an organic light-emitting element disposed over the protective layer, the organic light-emitting element including an anode, a cathode, and a light-emitting layer disposed between the anode and the cathode;

wherein the touch layer, the protective layer, the array substrate, and the organic light-emitting element are disposed on the substrate, in sequence, from bottom to top.

2. The touch display panel as claimed in claim 1, wherein the touch display panel includes a plurality of light-emitting areas and a plurality of non-light-emitting areas each between adjacent light-emitting areas;

wherein the organic light-emitting element is disposed in a corresponding light-emitting area, and the thin film transistor is disposed in a corresponding non-light-emitting area.

3. The touch display panel as claimed in claim 2, wherein the thin film transistor includes:

an active layer disposed on the protective layer, the active layer including an intermediate channel region and a source doped region and a drain doped region at both ends of the channel region;

a second insulating layer disposed on the active layer;

a first metal layer disposed on the second insulating layer, the first metal layer being disposed opposite to the channel region;

a third insulating layer disposed on the first metal layer and the anode, and covering the first metal layer and the anode; and a source metal and a drain metal disposed on the third insulating layer, the source metal being electrically connected to the source doped region, and the drain metal being electrically connected to the drain doping region.

4. The touch display panel as claimed in claim 3, wherein the touch display panel further includes:

the anode disposed on the second insulating layer and separated from the first metal layer;

a first electrode layer disposed on the anode, the first electrode layer being disposed opposite to the anode, a first via hole for accommodating the light-emitting layer being defined in the first electrode layer, and the first electrode layer being electrically connected to the drain metal;

a pixel-defining layer disposed on the source metal and the drain metal, the pixel-defining layer covering the source metal, the drain metal, and the third insulating layer, and the pixel-defining layer including pixel-defining bodies that are spaced apart from each other;

the light-emitting layer disposed between adjacent pixel-defining bodies and electrically connected to the anode through the first via hole; and the cathode disposed on the pixel-defining layer and the light-emitting layer.

5. The touch display panel as claimed in claim 4, wherein the anode is a transparent anode.

6. The touch display panel as claimed in claim 1, wherein the touch pattern layer includes a driving electrode and a sensing electrode, the driving electrode and the sensing electrode are both grid structures, and one of the driving electrode and the sensing electrode is bridged by the bridge layer.

7. The touch display panel as claimed in claim 6, wherein an orthographic projection pattern of the light-emitting layer on the touch pattern layer is located in the grid of the touch pattern layer.

8. The touch display panel as claimed in claim 6, wherein the driving electrode and the sensing electrode are both diamond-shaped grid structures.

9. The touch display panel as claimed in claim 4, wherein the touch display panel further includes a first encapsulation layer and a second encapsulation layer;

the first encapsulation layer is disposed between the protective layer and the array substrate; and the second encapsulation layer is disposed on the cathode.

10. A manufacturing method of a touch display panel, comprising steps as follows:

S10: providing a base, forming a substrate on the base, and forming a touch layer on the substrate, the touch layer including a touch pattern layer, a first insulating layer, and a bridge layer;

S20: forming a protective layer on the touch layer, the protective layer covering the bridge layer;

S30: forming an array substrate and an organic light-emitting element on the protective layer, the array substrate including an array of thin film transistors, and the organic light-emitting element including an anode, a cathode, and a light-emitting layer disposed between the anode and the cathode; and S40: peeling off the base;

wherein the touch layer, the protective layer, the array substrate, and the organic light-emitting element are disposed on the substrate, in sequence, from bottom to top.

11. The manufacturing method of a touch display panel as claimed in claim 10, wherein the touch pattern layer includes a grid-shaped driving electrode and a grid-shaped sensing electrode, the driving electrode and the sensing electrode are both grid structures, and an orthographic projection pattern of the light-emitting layer on the touch pattern layer is located in the grid of the touch pattern layer.

12. A touch display device comprising a touch display panel and a polarizer, the touch display panel comprising:

a substrate;

a touch layer disposed on the substrate, the touch layer including a touch pattern layer, a first insulating layer, and a bridge layer;

a protective layer disposed on the touch layer, the protective layer covering the bridge layer;

an array substrate disposed on the protective layer, the array substrate including an array of thin film transistors; and an organic light-emitting element disposed over the protective layer, the organic light-emitting element including an anode, a cathode, and a light-emitting layer disposed between the anode and the cathode;

wherein the touch layer, the protective layer, the array substrate, and the organic light-emitting element are disposed on the substrate, in sequence, from bottom to top.

13. The touch display device as claimed in claim 12, wherein the touch display panel includes a plurality of light-emitting areas and a plurality of non-light-emitting areas each between adjacent light-emitting areas;

wherein the organic light-emitting element is disposed in a corresponding light-emitting area, and the thin film transistor is disposed in a corresponding non-light-emitting area.

14. The touch display device as claimed in claim 13, wherein the thin film transistor includes:

an active layer disposed on the protective layer, the active layer including an intermediate channel region and a source doped region and a drain doped region at both ends of the channel region;

a second insulating layer disposed on the active layer;

a first metal layer disposed on the second insulating layer, the first metal layer being disposed opposite to the channel region;

a third insulating layer disposed on the first metal layer and the anode, and covering the first metal layer and the anode; and a source metal and a drain metal disposed on the third insulating layer, the source metal being electrically connected to the source doped region, and the drain metal being electrically connected to the drain doping region.

15. The touch display device as claimed in claim 14, wherein the touch display panel further includes:

the anode disposed on the second insulating layer and separated from the first metal layer;

a first electrode layer disposed on the anode, the first electrode layer being disposed opposite to the anode, a first via hole for accommodating the light-emitting layer being defined in the first electrode layer, and the first electrode layer being electrically connected to the drain metal;

a pixel-defining layer disposed on the source metal and the drain metal, the pixel-defining layer covering the source metal, the drain metal, and the third insulating layer, and the pixel-defining layer including pixel-defining bodies that are spaced apart from each other;

the light-emitting layer disposed between adjacent pixel-defining bodies and electrically connected to the anode through the first via hole; and the cathode disposed on the pixel-defining layer and the light-emitting layer.

16. The touch display device as claimed in claim 15, wherein the anode is a transparent anode.

17. The touch display device as claimed in claim 12, wherein the touch pattern layer includes a driving electrode and a sensing electrode, the driving electrode and the sensing electrode are both grid structures, and one of the driving electrode and the sensing electrode is bridged by the bridge layer.

18. The touch display device as claimed in claim 17, wherein an orthographic projection pattern of the light-emitting layer on the touch pattern layer is located in the grid of the touch pattern layer.

19. The touch display device as claimed in claim 17, wherein the driving electrode and the sensing electrode are both diamond-shaped grid structures.

20. The touch display device as claimed in claim 15, wherein the touch display panel further includes a first encapsulation layer and a second encapsulation layer;

the first encapsulation layer is disposed between the protective layer and the array substrate; and the second encapsulation layer is disposed on the cathode.

* * * * *